March 14, 1961  C. J. LUCIA ET AL  2,974,470
ROTARY CUTTER WITH FLUID TRANSMISSION
Filed Sept. 29, 1958  6 Sheets-Sheet 1

INVENTORS
CARROLL J. LUCIA.
GAYUS U. RAY.
IRA MAXON.
BY
ATTORNEY

March 14, 1961   C. J. LUCIA ET AL   2,974,470
ROTARY CUTTER WITH FLUID TRANSMISSION
Filed Sept. 29, 1958   6 Sheets-Sheet 2
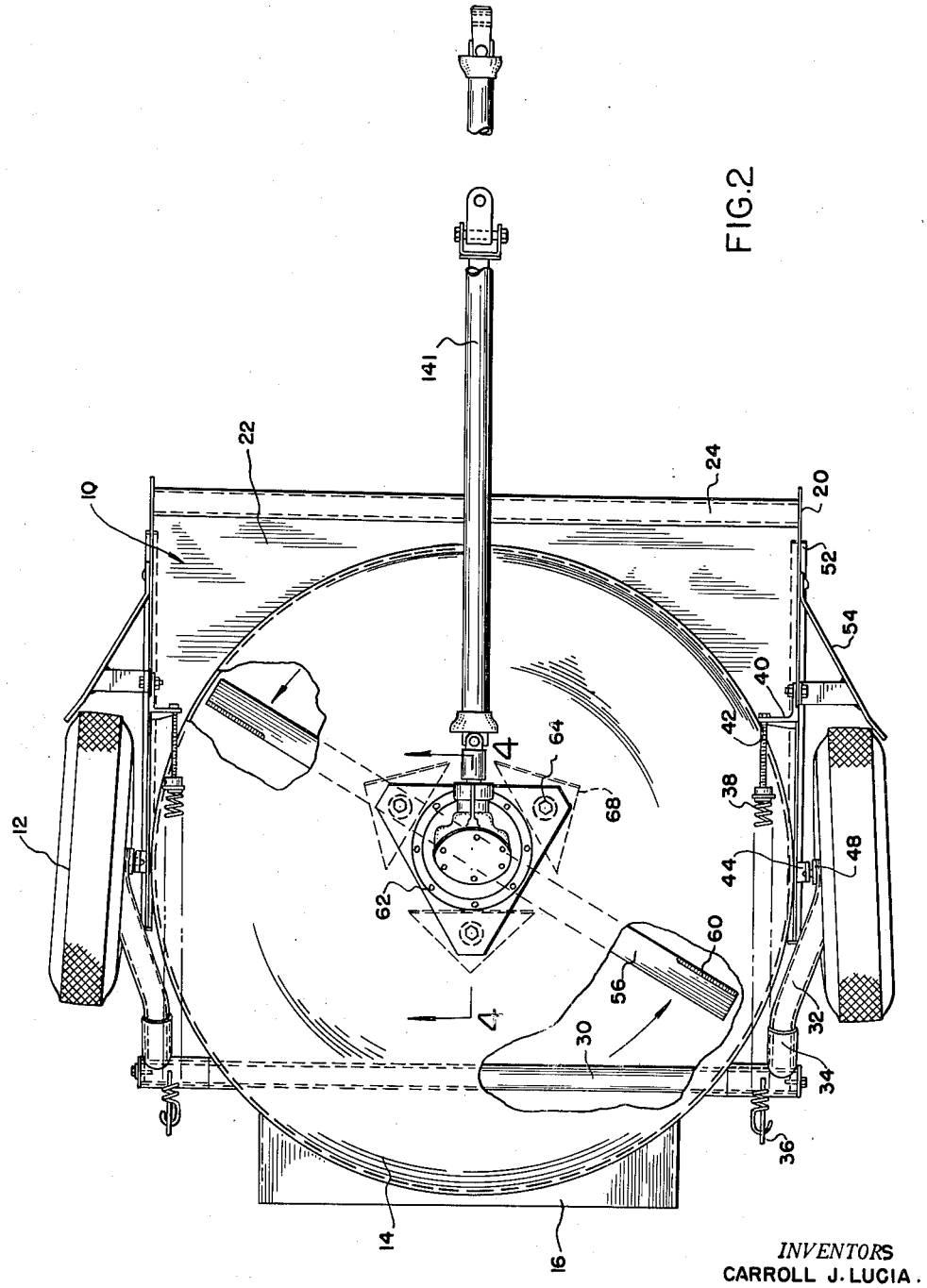
INVENTORS
CARROLL J. LUCIA.
GAYUS U. RAY.
BY IBA MAXON.
ATTORNEY

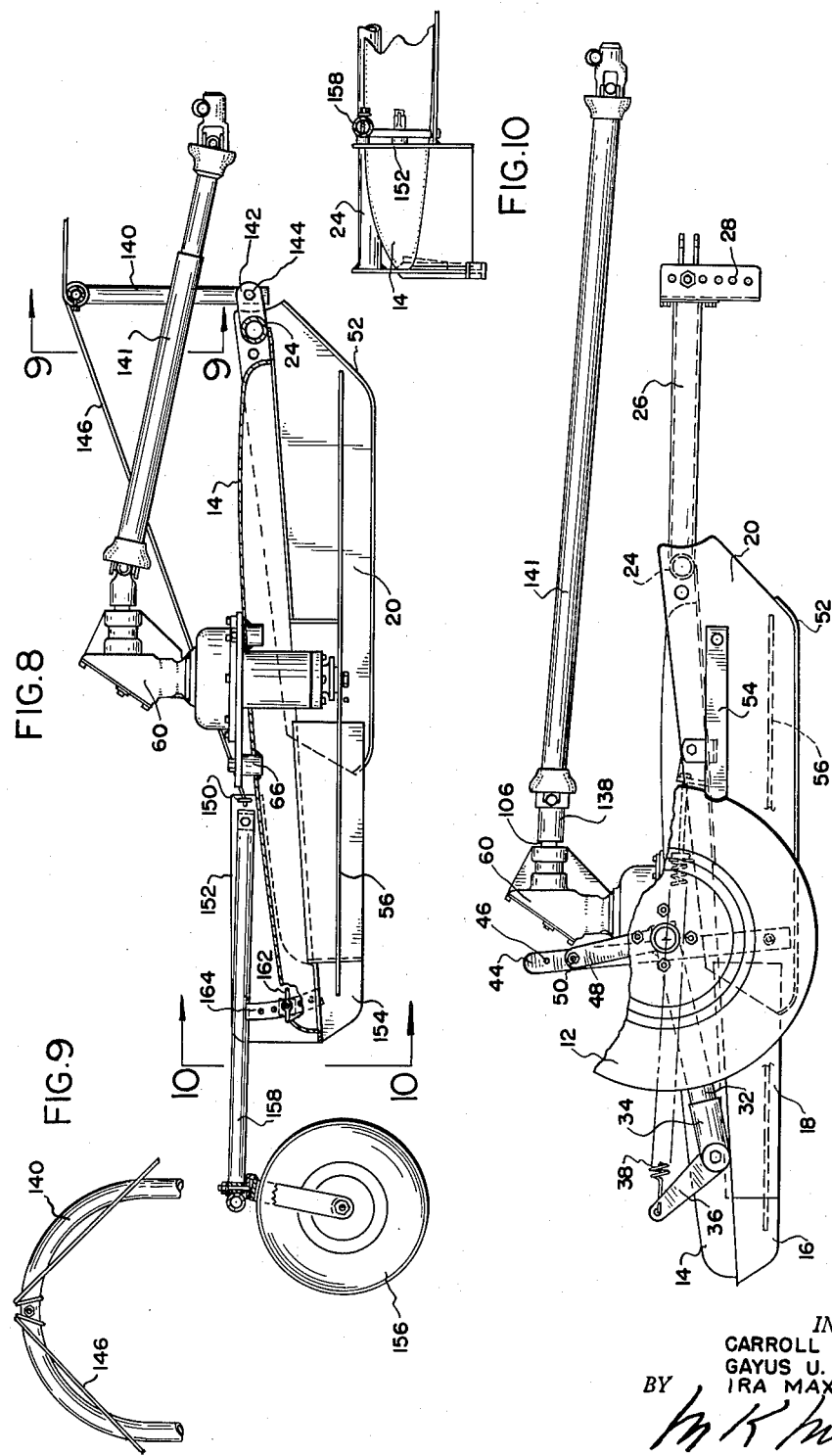

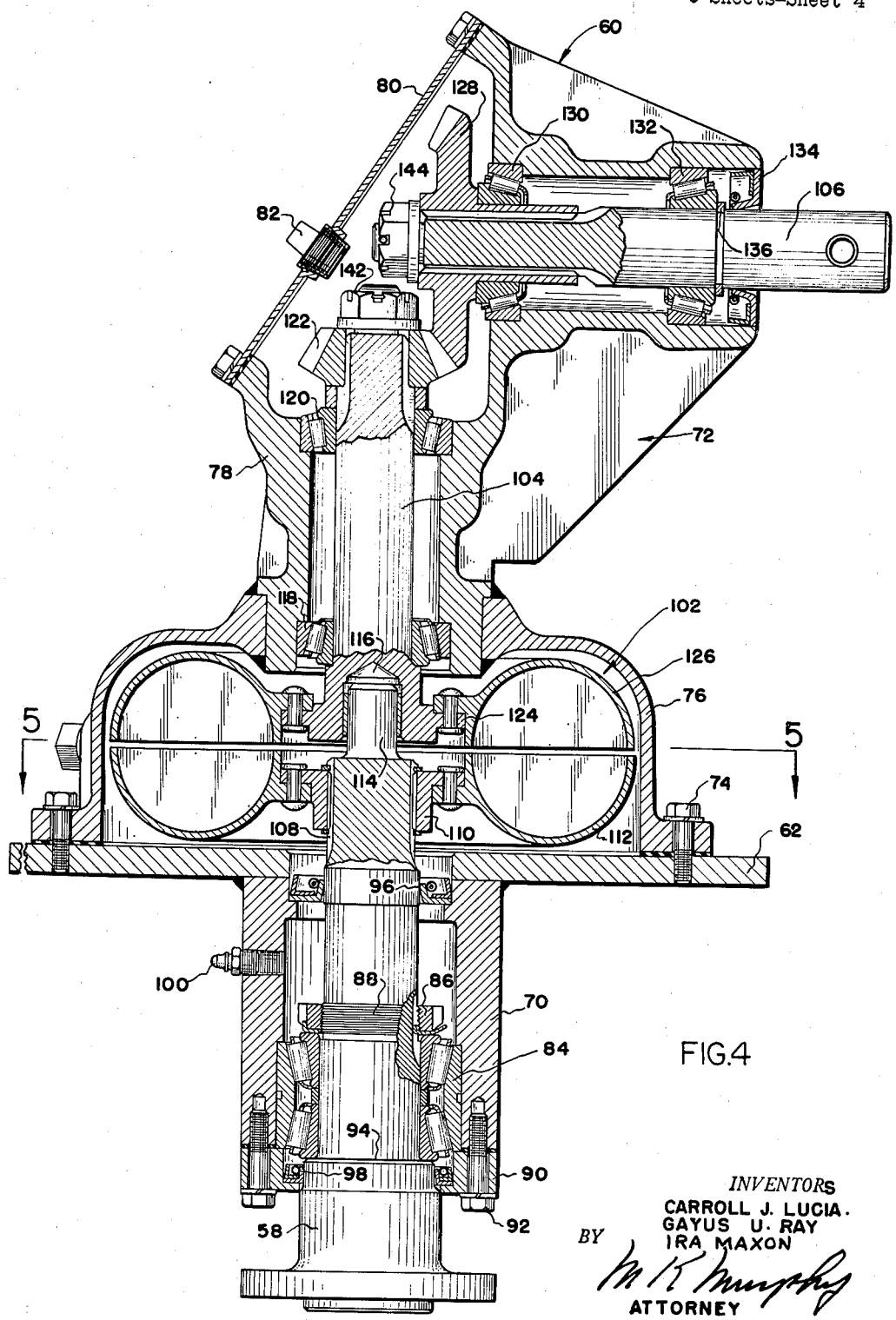

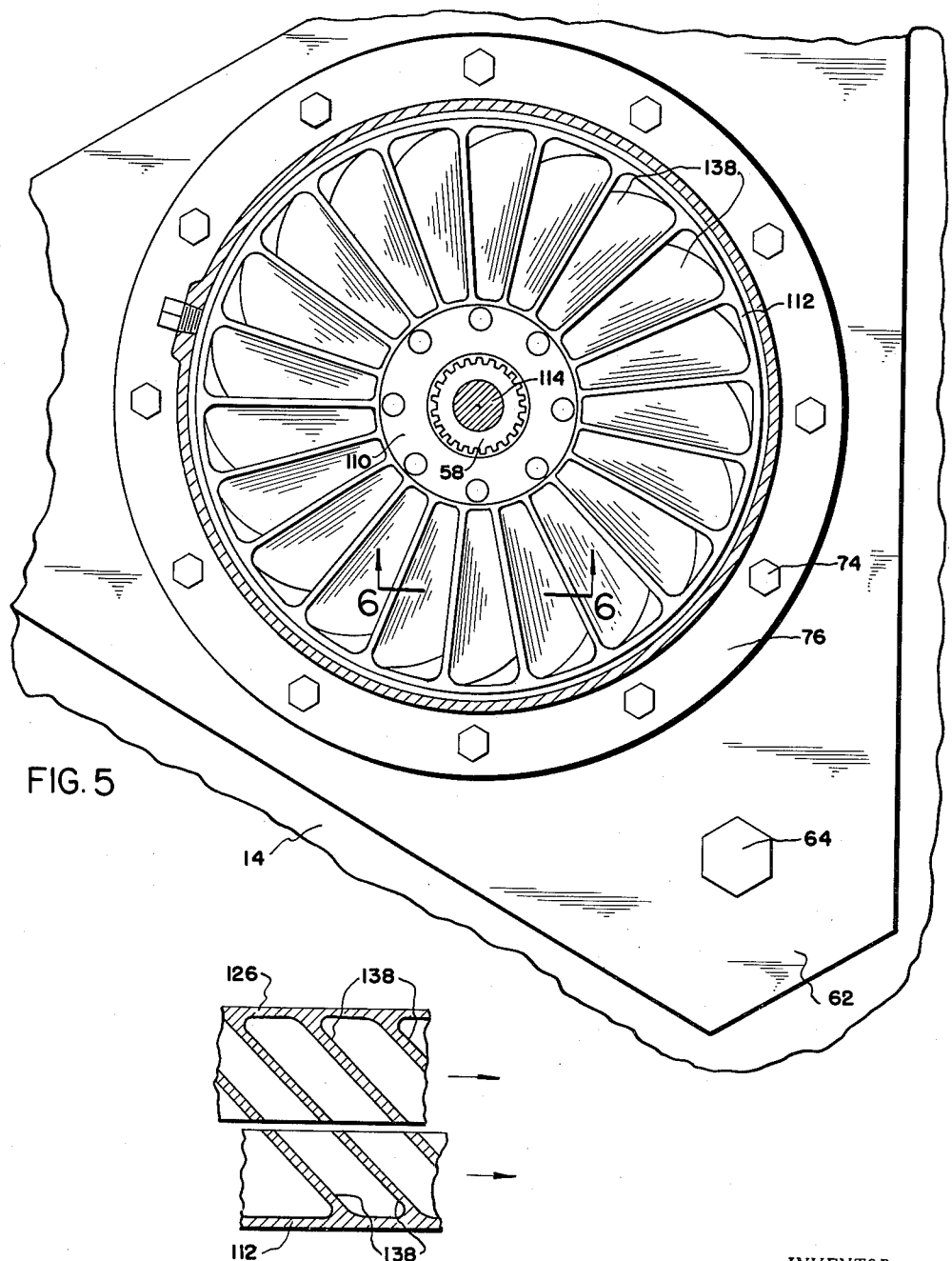

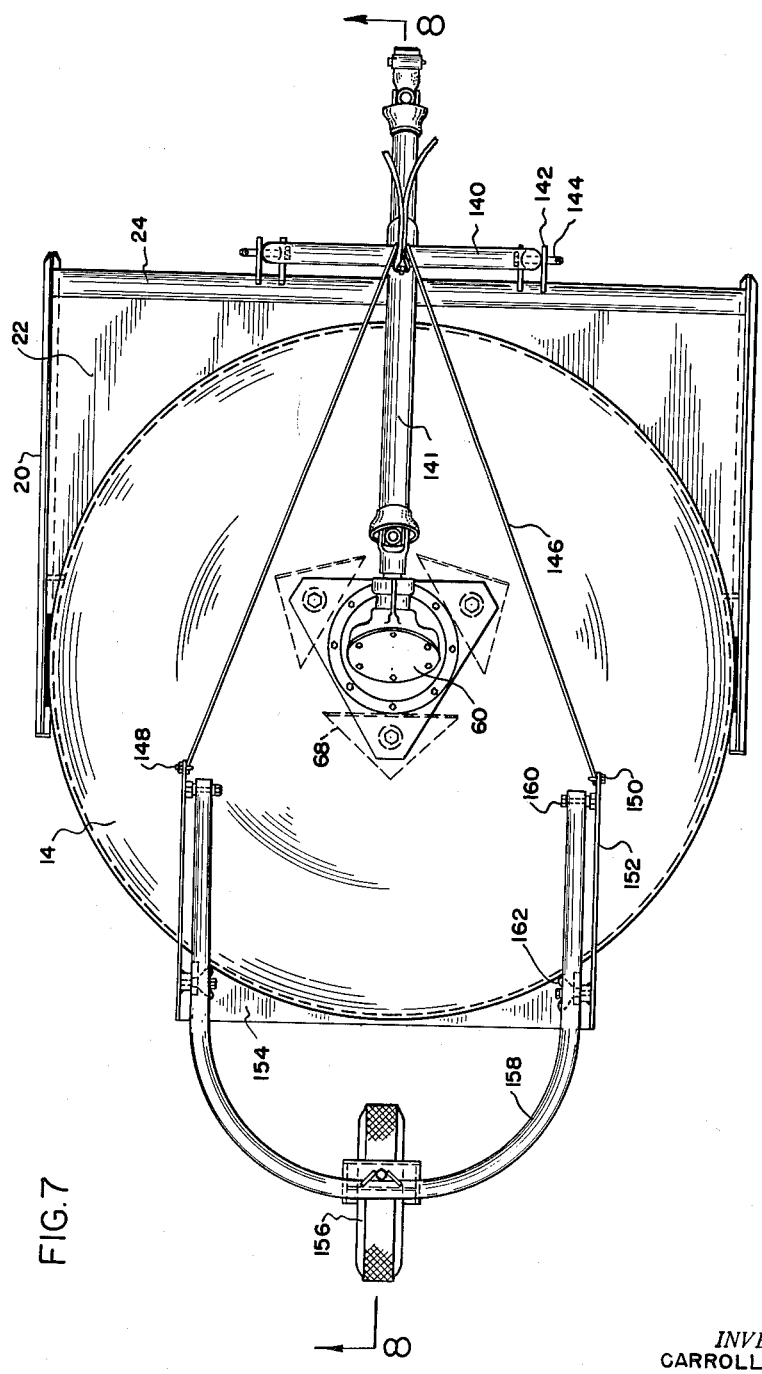

United States Patent Office 2,974,470
Patented Mar. 14, 1961

2,974,470

ROTARY CUTTER WITH FLUID TRANSMISSION

Carroll J. Lucia, Green Bay, Wis., and Gayus U. Ray and Ira Maxon, Detroit, Mich., assignors to Dura Corporation, a corporation of Michigan Filed Sept. 29, 1958, Ser. No. 763,853

7 Claims. (Cl. 56—25.4)

This invention relates to rotary cutters and shredders.

During recent years, rotary cutters or rotary mowers, as they are sometimes called, have been used increasingly for agricultural mowing and for clearing land of grass, weeds, small saplings, undergrowth, etc. Use of such machines for cutting over land where there is a growth of alders, small saplings, etc., has imposed tremendous loads on the cutter bar and on the power transmission mechanism which has caused excessive wear and in many instances failure of the drive train.

The primary object of our invention is to provide an improved power transmission for rotary cutters which efficiently transmits the torque of the tractor engine to the cutting blade; isolates the shock loads imposed on the cutter blade when the latter hits stumps, rocks and the like, from the gearing of the drive train; provides a slipping action when the blade encounters abnormal cutting conditions, and which permits overrun of the blade when the tractor is brought to a sudden stop.

Another object is to provide an improved rotary cutter having means for eliminating, at least partially, the bending strains imposed on the cutter housing and on the transmission gearbox by the blade encountering fixed objects on the ground, such as stumps, etc.

Another object is to provide an improved and easily operated means for changing the cutting height of a rotary cutter of the trailer type.

Still another object is to provide a rotary cutter having a relatively open or enlarged "throat" whereby the ability of the machine to cut high brush, small saplings and weeds is improved.

A further object is to provide a rotary cutter which embodies an automatic warning function which warns the operator of a decrease or cessation in the cutting action and thus tends to eliminate necessity of backing the tractor to retrace ground already covered.

Other objects and advantages of our invention will be apparent from the following specification which, taken in conjunction with the accompanying drawings, discloses preferred embodiments of the invention.

In the drawings, in which reference characters have been used to designate like parts referred to in the following description:

Fig. 2 is a plan view of the cutter shown in Fig. 1 with parts broken away to show structural details;

Fig. 3 is a side elevation thereof with parts broken away to show details;

Fig. 4 is a vertical section on an enlarged scale of the power transmission of the rotary cutter, taken as indicated by the line 4—4 of Fig. 2;

Fig. 5 is a horizontal section taken along the line 5—5 of Fig. 4;

Fig. 6 is a fragmentary sectional view taken along the line 6—6 of Fig. 5, and showing a detail of the fluid coupling vanes, both coupling elements being depicted;

Fig. 7 is a plan view of a modified form of rotary cutter of the type known as the three point hitch type;

Fig. 8 is a horizontal sectional view taken along line 8—8 of Fig. 7; and

Figure 1:
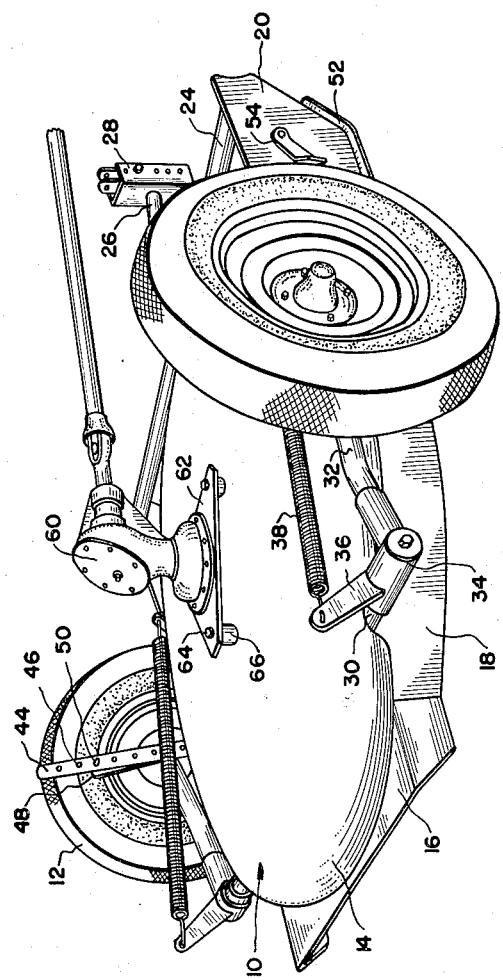
Fig. 1 is a perspective view of a trailer type rotary cutter embodying the features of our invention.

Figs. 9 and 10 are fragmentary detail views taken along lines 9—9 and 10—10 respectively of Fig. 8.

Referring now particularly to Figs. 1–6 inclusive, it may be seen that the improved rotary cutter comprises a main frame or body 10 supported by wheels 12. The body 10 consists of a deck 14, to which is secured, a delivery chute 16, a pair of side skirt members 18, a pair of side members 20 and a throat member 22. A rigid bar 24 extends across the forward portion of the body. This bar 24 is suitably secured at each end thereof to the adjacent side member 20 and at its central portion mounts a draw bar 26 which carries a hitch 28 for attachment to the tractor towing bracket.

The deck 14 is of annular concave shape and is made preferably of a steel tank end. Manufacturers of storage and pressure tanks for liquids and gases stock such tank ends in various sizes and gauges and we have found these parts to be ideally suited for the purpose shown and described herein. The chute 16, skirts 18, side pieces 20 and throat 22, are likewise of steel, and these parts are firmly welded to the deck in such manner that an extremely rugged frame well suited for support of the cutter knife, power transmission, etc., results.

A second rigid bar 30 is suitably secured to the deck and skirts near the rear of the cutter. This bar strengthens the rear portion of the assembly and serves as a dead axle for the wheel mounting arms 32. The wheels 12 are mounted respectively on the outer ends of the arms 32 by means of conventional stub axles. The inner ends of arms 32 are swingably mounted on the protruding ends of the bar 30 by means of elbow members 34.

As can be seen in Figs. 1–3, each elbow 34 has a transversely extending portion rotatably mounted on the bar 30 and a forwardly extending portion which is rigidly secured to the wheel arm 32 by any suitable means. Each transverse portion carries an upwardly extending arm 36. The respective arms 36 are connected by counterbalance springs 38 with brackets 40 carried by the side members 20. The latter are of fairly deep section and extend above the plane of the throat 22 as may be seen from the drawing. Adjusting screws 42 are provided to adjust the force of the balance springs.

The balance springs 38 tend to force the wheel arms 32 downwardly and thus lift the cutter body off the ground, but this yieldable suspension is for height adjustment only and not for suspending the cutter body during use as will be presently made clear.

Each side piece 20 carries an upright member 44 (see Fig. 3 particularly) provided with a plurality of holes 46. Each wheel arm 32 carries an upright member 48 which extends at approximately a 90° angle to the wheel arm and is secured to the latter at the mounting point of the wheel stub axle. The uprights 48 each have a hardened pin 50 secured at their upper ends.

The pins 50 are adapted to engage the holes 46 of the uprights 44 and thus fix the positions of the wheels 12 with respect to the body 10 of the cutter. By changing the positions of the pins 50 in the holes 46, the height of the body 10 above the ground (and thus the cutting height) may be adjusted. If the cutter is being operated along a side-hill, one wheel 12 may be adjusted to a different relative position than the opposite wheel and thus compensate for the slope of the surface being cut.

Adjustment of the wheel heights is easily accomplished by means of our novel counterbalanced wheel mounting. The members 44 are of spring steel and because of their relatively long length may be easily bent inwardly of the assembly to disengage the pins 50 from the holes 46. Once this is done, the particular wheel arm 32 on the side being adjusted is free to swing about the axis of the axle bar 30 restrained only by the spring 38. It is then a simple matter to raise or depress the cutter body with respect to that wheel until the desired adjustment in relative height is obtained, then permit the upright 44 to spring back to its normal position with the pin 50 engaged in the proper hole 46. Because the weight of the cutter assembly is counterbalanced by the spring 38, little effort is required to raise or depress the cutter body and thus the cutting height may be adjusted for cutting or for transport in minimum time with minimum effort.

The side pieces 20 also carry runners 52 for engaging the ground during close cutting or when cutting over uneven terrain, and fenders 54 for protecting the tires from engagement with obstacles.

Reference is now made to Figs. 1–6 inclusive, for a description of the cutting and power transmission mechanism of the assembly.

The cutting blade or cutter bar 56 is mounted on the lower flanged end of a lower transmission shaft 58 (Fig. 4). The blade has knife portions 60 and is designed for rotation in a counterclockwise direction as shown in Fig. 2. The usual securing means, such as bolts and nuts, (not shown) is provided such that the blade may be removed for sharpening, etc.

The transmission assembly 60 (Fig. 4) is mounted on a triangular metal plate 62 of relatively heavy section. The plate 62 is detachably secured to the central portion of the deck 14 by means of bolts 64, suitable spacers 66 being used where necessary to provide desired alignment. A plurality of reinforcing plates 68 (Fig. 2) are welded to the underside of the deck in the areas of the holes for the bolts 64 to increase the strength of the deck section at these points, the deck itself being somewhat flexible at its central portion for beneficial reasons as will be explained below.

The power transmission assembly 60 comprises a lower housing 70 securely welded to the plate 62 and an upper housing 72 detachably secured to the plate by bolts 74. The upper housing consists of two housing portions 76 and 78 welded together. The portion 78 is suitably flanged for reinforcing purposes and is provided with a removable cover plate 80 and plug 82 for inspection purposes and for adding lubricant.

The lower transmission shaft 58, which is the output shaft to which the cutter blade is directly attached, is mounted in the lower housing 70 by means of a double roller bearing 84. The bearing is positioned between a threaded ring 86 which is adjustable on the threads 88 and a shoulder 94 formed on the shaft 58. An end cap 90 removably secured to the housing by screws 92 permits removal of the shaft and bearing assembly. An upper seal 96 seals the lower housing off from the upper housing assembly, and a lower seal 98 prevents leakage of lubricant from the lower housing. A grease nipple 100 is provided for adding lubricant to the housing.

The upper housing 72 comprises a shroud 76 which houses a fluid coupling generally designated by numeral 102, and an angular portion 78 which mounts the intermediate power shaft 104 and the input shaft 106. The latter is housed in the horizontally extending portion of the upper housing as shown.

The output shaft 58 is splined at 108 for driving engagement with the hub 110 which carries the fluid coupling runner 112. Above the splined portion, the shaft 58 is formed with a reduced pilot portion 114 which is received in the pilot hole 116 of intermediate shaft 104, a suitable bearing bushing being provided to permit relative rotation between the shafts and to compensate for slight misalignment due to manufacturing tolerances.

The shaft 104 is rotatably mounted in housing portion 78 by means of rollers bearings 118, 120, and has a bevel pinion 122 splined on its upper end. The lower end thereof has an integrally formed hub 124 which carries the fluid coupling impeller 126.

The input shaft 106 has a bevel gear 128 splined on its inner end, said gear being disposed in meshing engagement with the pinion 122. A pair of roller bearings 130, 132, support the shaft, a snap ring 136 being provided for retaining the shaft in place and a seal 134 for sealing the housing at the shaft opening.

The input shaft 106 is adapted to be connected to the power take-off of the tractor or towing vehicle (not shown) by means of a universal joint 138 and drive shaft 141. A second universal joint and another shaft may or may not be provided in the driving train in accordance with the type of towing vehicle, but this mechanism is more or less standard and forms no part of the present invention.

As so far described, it may be seen that the transmission 60 may be easily disassembled for servicing, and it is not necessary to remove it from the cutter body, although this is usually done. Removal of the screws 74 permits removal of the upper housing assembly which includes the coupling impeller 126. The cover 80 may then be removed, which permits removal of nuts 142, 144, thus allowing shafts 104 and 106 to be pulled axially and gears 122, 128, to be removed through the top opening. Removal of cap 90 permits shaft 58 to be pulled downwardly, runner 112 having been previously lifted off the splines 108.

The upper housing 72 is normally filled with oil to about the level of the top of pinion 122. This provides lubrication of the gear 128 and shaft 106 by pumping action of the gearset and facilitates inspection of the oil level by removal of plug 82. The oil, in addition to providing lubrication for the parts, serves as the coupling medium for the fluid coupling. Any of the commercially obtainable of brands of lubricating oil of suitable viscosity for good operation of the coupling may be used. Type A, automatic transmission oil has been used successfully.

With the oil level as described, the coupling is constantly under slight charging pressure.

As hereinbefore mentioned, the seal 96 seals off the upper housing from the lower housing 70, the cavity of the latter being filled with heavy grease instead of oil. This feature is of importance. Because of the severe stresses imposed on the output shaft 58 and the bearing 84 in use, grease has been found to be more satisfactory in some instances for lubrication of the lower drive unit, and because of its viscous nature, has no tendency to leak as is the case with oil. There is much less tendency for the upper drive unit to leak because the heaving stresses imposed by the cutter blade striking stumps, rocks, etc., are isolated from the upper drive unit by the fluid coupling. Any leakage through the seal 96 is absorbed by the grease in the lower unit, thus the entire power transmission assembly is substantially leakproof.

Referring now to Figs. 4, 5 and 6, it may be seen that the impeller 126 and runner 112 of the coupling 102 are identical in form and may be cast from the same die. The vanes 138 of both members are inclined axially in the same rotational direction and in the same amount. Because the upper housing is filled with oil up to about the top of the vertical portion thereof, the fluid coupling will always be filled completely by gravity.

Rotation of the intermediate shaft 104 then will cause rotation of the impeller 126 at the same speed and the fluid will be impelled by centrifugal force from the cups formed by the impeller vanes 138 into the corresponding cups of the runner 112, and the latter along with driven shaft 58 will be rotated in the manner well known in fluid coupling practice.

In the example being described, the rotary cutter blade 56 is five feet in length; and for optimum cutting efficiency, it has been found that a blade speed of from 700 to 950 r.p.m. is desirable. The gearset 122, 128, provides a step up ratio of 1.87 to 1 from the input shaft 106 which permits a speed of about 540 r.p.m. for the power take-off shaft of the tractor. The transmission described has been designed for use with tractors in the 30 to 60 horsepower class, and it has been found that the aforementioned operating characteristics are obtainable with a fluid coupling of nine inches in diameter. The coupling shown has its vanes in both the impeller and runner inclined 45° in the driving direction.

It will be understood, of course, that the driving gear ratio, the size and design of coupling, the operating speeds, etc., may be varied to provide for different blade speeds, different horsepower tractors, different cutting conditions, etc. By inclining the vanes 138 of the coupling 102 as described, it is possible to transmit the full available driving torque of a 60 horsepower tractor to the cutting blade 56 with a nine inch diameter coupling with a slip characteristic of 30%. The slip varies with the load imposed on the blade, but so long as substantially full available torque is transmitted within the optimum speed range, satisfactory cutting will result.

To transmit power under the described conditions with a straight-vane coupling, a coupling of twelve inch diameter is required. While the smaller coupling is desirable from the standpoint of compactness and cost, it is another feature of the inclined vane coupling which renders its use most desirable and advantageous in the combination herein described and claimed.

Inclination of the vanes 138 as illustrated increases the driving efficiency of the coupling and conversely decreases the efficiency of the coupling on coast. The latter feature is most advantageous as a safety measure. Most rotary cutters are used with tractors having a power take-off driven from some part of the tractor driving train between the clutch and the driving wheels. As a result, when the tractor clutch is disengaged to stop the tractor, the inertia or stored energy of the rotating cutter blade is effective to propel the tractor. Tractor brakes are of comparatively low efficiency, and there have been many accidents during the mowing of fields with rotary cutters because of the operator's inability to bring the tractor to a quick stop upon encountering an obstacle. A five or six foot cutting blade rotating at 900 r.p.m. can exert a substantial driving force sufficient to propel a tractor several yards before the stored energy is dissipated. Many tractor operators refuse to use rotary cutters because of this hazard.

In the arrangement just described, the comparative inefficiency of the fluid coupling upon coast provides a substantial overrun or freewheeling effect which makes it possible for the tractor operator to bring the tractor to a sudden stop without difficulty. While the runner 112 will overrun the impeller 126 with sufficient freedom to permit the tractor to be stopped suddenly, it does also provide considerable retarding force. In using the combinatoin described, it has been found that upon disengagement of the tractor clutch, the five foot cutter blade coasts to a stop in fifty-five seconds with one hundred percent slip of the coupling, the impeller being stopped completely by the resistance of the driving train between it and the tractor clutch.

The fluid coupling is also advantageous in that it completely eliminates the need for a slip clutch of the friction type usually provided in rotary cutters. The coupling 102 will permit the blade 56 to stop completely upon the blade hitting a rock or stump without stalling the tractor engine or breaking any of the shafts or gears, the runner 112 slipping one hundred percent with respect to the impeller.

By providing a completely fluid driving connection between the blade and the transmission gearset, all tangential shock loads on the blade are completely eliminated from the gears and parts in the upper housing. This advantage is, in itself, of extreme importance because the transmission of shock loads from the blade to the angle gears is the greatest single cause of rotary cutter failure and service trouble.

Another advantageous feature of the present design is that it permits the use of three—actually four—roller bearings in approximate axial alignment, thus providing a structure of greater ruggedness and durability with consequent freedom from service troubles.

A still further advantage in the use of the fluid coupling in the rotary cutter drive train resides in the automatic warning to the operator that the blade has slowed down to the speed below cutting speed or is about to stall. Under such conditions, there is an immediate "loading up" of the tractor engine which is instantly apparent to the operator. He can then release the clutch and permit the engine to regain speed and change engine speed or driving ratio if necessary. In the operation of rotary cutters with conventional mechanical driving trains, no such warning is given, and it frequently happens that a considerable area is traversed with little or no cutting before the operator becomes aware of the fact. It is difficult and time consuming to back a tractor with a trailing implement, and any feature tending to reduce necessity for backing is desired.

The fluid coupling also permits the cutter blade to be brought up to cutting speed gradually from dead stop and thus reduces the stresses on the power transmission incident thereto. When the tractor clutch (or the power take-off clutch, if one is provided) is engaged, there is slippage between the impeller 126 and the runner 112 which gradually decreases and applies the load of the blade to the driving train in a gradual manner as the cutter blade comes up to speed.

As stated above, the deck 14 of the rotary cutter comprises a tank-end which is formed of disced, thin steel, flanged at its marginal edge. The thickness of the deck for a cutter like that illustrated is normally one-eighth inch. As a result, the deck is somewhat flexible, particularly at its center. This is advantageous because it permits the transmission 60 to wobble slightly where the blade 56 hits solid objects and thus absorb some of the sudden shock which sometimes causes rupture of solid, inflexible decks.

As is apparent from Fig. 3, the deck 14 is inclined upwardly toward the front of the cutter assembly, although the cutter blade 56 is horizontal. This opens the "throat" of the cutter and subjects the material being cut to the action of the blade with less bending at the cutting plane, which increases the cutting efficiency.

Reference is now made to Figs. 7 to 10 inclusive, in which parts similar to those described above have been given the same reference numerals. These figures show a rotary cutter embodying our invention but adapted to be mounted on tractors having the so called "three-point hitch" which is well known in the art.

This cutter is hitched to the towing vehicle through a hitch structure which includes a yoke 140. This yoke is vertically mounted on the cross bar 24 which carries two sets of forwardly extending arms 142 welded thereon. The yoke 140 is pivotally attached to these arms by pins 144. The pins 144 are adapted to be engaged by the tractor hitch arms (not shown), and a flexible cable 146 is looped around the central portion of the yoke and fastened at 148, 150, to the upwardly extending flanges 152 of the discharge chute 154. The forward end of cable 146 is adapted for attachment to a fixed point on the tractor.

The drawing shows a single trailer wheel 156 attached to the flanges 152 by means of a horizontally disposed yoke 158. This wheel is preferably a caster wheel and may be used or not as desired. The wheel and mounting yoke may be readily removed by removing the nuts 160, 162. When used to support the rear end of the cutter, the wheel 156 is adjustable in height by means of the punched straps 164 as is apparent from Fig. 8.

The rotary cutter of Fig. 8 is mounted on the tractor by engaging the tractor lift arms with the pins 144 and attaching the cable 146 to a fixed point on the tractor. The tractor lift arms are movable vertically by power, and thus the entire cutter assembly is vertically adjustable for varying the cutting height or for transport.

The cable 146 supports the rear portion of the assembly such that elevation of the pins 144 by the tractor lift arms results in the entire cutter assembly being lifted vertically. On the other hand, the cable 146 offers no restriction whatsoever to pivoting of the assembly about the axis of the pins 144, so the cutter assembly may readily follow the ground contour. This is true whether or not caster wheel 156 is used. This mounting frees the tractor and cutter frame from the stresses resulting from contact of the frame with the ground when mowing over rough terrain as is the case with conventional hitches which utilize a rigid link for the upper connection.

While we have shown and described only two of the many forms that our invention might assume, it will be understood that such has been done for illustrative purposes and not by way of limitation.

We claim:

1. In a rotary cutter having a body structure including a deck member, an angle drive power transmission including upper and lower housing members, an output shaft rotatably mounted in the lower housing by a plurality of concentrically disposed, axially spaced bearings, an intermediate shaft rotatably mounted in the upper housing by a plurality of concentrically disposed, axially spaced bearings, a fluid torque transmitting coupling drivingly interconnecting said intermediate shaft and said output shaft, said fluid coupling including a fluid impeller carried by said intermediate shaft and a fluid runner carried by said output shaft, said fluid impeller being provided with fluid directing vanes inclined such that their free edges lead with respect to normal rotation thereof, an input shaft rotatably mounted in the upper housing, and gearing interconnecting said input shaft and said intermediate shaft.

2. The combination claimed in claim 1 wherein said fluid runner is provided with vanes inclined such that their free edges lag with respect to normal rotation of the coupling.

3. The combination claimed in claim 1 wherein the vanes of the coupling element are inclined at an angle of 45° with respect to the coupling axis.

4. The combination claimed in claim 1 wherein said input shaft has its axis disposed at an angle with respect to said other shafts and said gearing interconnecting said input shaft and said intermediate shaft is bevel gearing.

5. The combination claimed in claim 1 wherein said output shaft and said intermediate shaft are coaxially disposed and have a rotative pilot connection therebetween.

6. The combination claimed in claim 1 wherein a cutter blade is attached to the lower end of said output shaft.

7. In a rotary cutter having a body structure including a deck member, an angle drive power transmission including a housing having upper and lower housing members, an output shaft rotatably mounted in the lower housing member by a plurality of concentrically disposed, axially spaced bearings, an intermediate shaft rotatably mounted in the upper housing member by a plurality of concentrically disposed, axially spaced bearings, and an input shaft rotatably mounted in said upper housing member on an axis disposed at an angle to said intermediate shaft and drivingly connected to said intermediate shaft, a fluid torque transmitting coupling mounted in said housing and drivingly interconnecting two of said shafts, said fluid coupling including a fluid impeller carried by one of said drivingly connected shafts and a fluid runner carried by the other of said drivingly connected shafts, said fluid impeller being provided with fluid directing vanes inclined such that their free edges lead with respect to normal rotation thereof.

References Cited in the file of this patent

UNITED STATES PATENTS

| | | |
|---|---|---|
| 2,385,834 | Nallinger et al. | Oct. 2, 1945 |
| 2,477,442 | Cramer et al. | July 26, 1949 |
| 2,557,894 | Siesel | June 19, 1951 |
| 2,665,553 | Foster et al. | Jan. 12, 1954 |
| 2,685,160 | Kuhary et al. | Aug. 3, 1954 |
| 2,719,726 | Johnston | Oct. 4, 1955 |
| 2,726,513 | McWethy et al. | Dec. 13, 1955 |
| 2,769,295 | Northcote | Nov. 6, 1956 |
| 2,828,968 | Engler | Apr. 1, 1958 |
| 2,859,578 | Hall | Nov. 11, 1958 |
| 2,877,616 | Gewalt et al. | Mar. 17, 1959 |
| 2,877,618 | Thornton-Trump | Mar. 17, 1959 |